(12) United States Patent
Rollet

(10) Patent No.: US 8,336,087 B2
(45) Date of Patent: Dec. 18, 2012

(54) ROBUST DIGEST AUTHENTICATION METHOD

(75) Inventor: Romain Rollet, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 1099 days.

(21) Appl. No.: 12/040,152

(22) Filed: Feb. 29, 2008

(65) Prior Publication Data
US 2008/0216160 A1   Sep. 4, 2008

(30) Foreign Application Priority Data
Mar. 1, 2007   (EP) .................................... 07290257

(51) Int. Cl.
*H04L 9/32* (2006.01)
(52) U.S. Cl. .................. 726/6; 726/2; 726/27; 713/151; 713/152; 713/153; 713/154; 713/155; 713/160; 713/171; 709/229
(58) Field of Classification Search ............... 726/2, 6, 726/27; 713/171, 168, 151–155, 160; 709/229
See application file for complete search history.

(56) References Cited

U.S. PATENT DOCUMENTS

| | | | |
|---|---|---|---|
| 6,915,437 B2 * | 7/2005 | Swander et al. ................. 726/1 |
| 7,181,620 B1 * | 2/2007 | Hur ................................ 713/171 |
| 7,234,058 B1 * | 6/2007 | Baugher et al. ................ 713/163 |
| 2002/0150253 A1 * | 10/2002 | Brezak et al. ................... 380/281 |
| 2003/0120745 A1 * | 6/2003 | Katagishi et al. .............. 709/217 |
| 2003/0149871 A1 * | 8/2003 | Medvinsky ..................... 713/155 |
| 2004/0015418 A1 * | 1/2004 | Dooley et al. ................... 705/28 |
| 2004/0049451 A1 * | 3/2004 | Berardi et al. ................... 705/39 |
| 2005/0033689 A1 * | 2/2005 | Bonalle et al. ................... 705/40 |
| 2005/0144074 A1 * | 6/2005 | Fredregill et al. ............... 705/14 |
| 2006/0129488 A1 * | 6/2006 | Vincent ........................... 705/50 |
| 2006/0184681 A1 | 8/2006 | Bernardi et al. |
| 2007/0283163 A1 * | 12/2007 | Relyea .......................... 713/184 |
| 2009/0146832 A1 * | 6/2009 | Ebert et al. .................. 340/825.49 |

FOREIGN PATENT DOCUMENTS
EP   1 577 736 A2   9/2005

OTHER PUBLICATIONS

Kohl et al., "The Kerberos Networks Authentication Service (V5)", Network Working Group, Sep. 1993, pp. 1-105.*

* cited by examiner

*Primary Examiner* — Kambiz Zand
*Assistant Examiner* — Tongoc Tran
(74) *Attorney, Agent, or Firm* — Oblon, Spivak, McClelland, Maier & Neustadt, L.L.P.

(57) ABSTRACT

The present invention relates to a method of authenticating a user in a communication system comprising a user terminal and an authentication server which is capable of storing two types of nonce values, namely dedicated nonce values unique in the system and common nonce values shared between users in the system. In the method the authentication server receives (401) from the user terminal an access request. Then the authentication server uses a predefined criterion for determining the type of a first nonce value to be sent to the user terminal as a response to the access request. In case the predefined criterion is fulfilled, then a dedicated nonce value is sent, otherwise a common nonce value is sent (402). Then the authentication server receives (403) from the user terminal a response comprising a second nonce value and a response code to the first nonce value. The authentication server then determines whether the response code is correct and whether the second nonce value corresponds to the first nonce value.

19 Claims, 4 Drawing Sheets

| V | P | A | Nonce | Date |
|---|---|---|---|---|
| 0 | 0 | 0 | | |
| 0 | | 0 | | |
| 0 | 0 | 0 | | |
| 0 | 0 | 0 | | |
| 1 | 0 | 0 | 5869abc9 9c6654da | 17/02/2007; 12:00 |
| 0 | 0 | 0 | | |
| 1 | 0 | 1 | 5963ac3b 6541dd12 | 17/02/2007; 13:30 |
| 0 | | 0 | | |

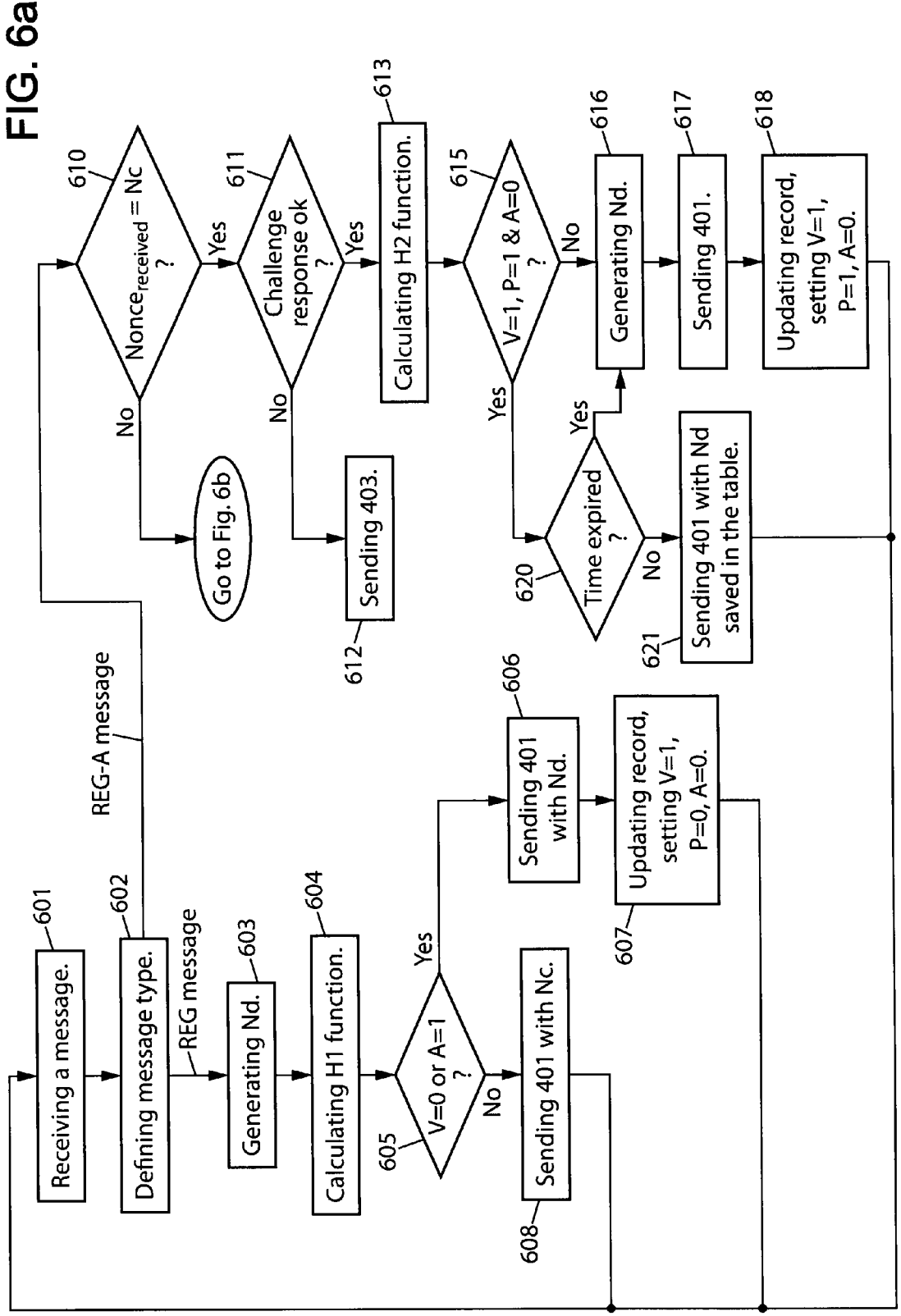

ROBUST DIGEST AUTHENTICATION METHOD

TECHNICAL FIELD

The present invention relates to a method for authenticating a user in a communication system. More specifically the invention relates to an improved authentication method based on a digest authentication scheme as defined, for instance, by Request for Comments (RFC) 2617.

BACKGROUND OF THE INVENTION

The digest authentication scheme is used in session initialisation protocol (SIP) to negotiate credentials with a voice over internet protocol (VoIP) user. It was originally designed for hyper text transfer protocol (HTTP) and was specified in RFC 2617. It is widely used in the Internet to authenticate users and to give access to restricted web areas.

The following description gives an example of a situation where a client computer requests access to a server in accordance with the digest authentication scheme. A typical transaction consists of the following steps:

The client asks for a page that requires authentication but does not provide a username and password. Typically this is because the user simply entered the address or followed a link to the page.

The server responds with a so called "401" response code, providing the authentication realm and a randomly-generated, single-use value called a nonce. A realm is a string to be displayed to users so that they know which username and password to use. This string usually contains at least the name of the host performing the authentication and can additionally contain the collection of users who might have access. A nonce is a server-specified data string which should be uniquely generated each time a 401 response is generated.

At this point, the client presents the authentication realm to the user and prompts for a username and password. The user may decide to cancel at this point.

Once a username and password have been supplied, the client resends the same request but adds an authentication header that includes the response code and the nonce. Basically, the response code is a hash value calculated by the client from the provided nonce, username and password.

The server checks the returned response code, accepts the authentication and the requested web page is returned. If the response code is incorrect, the server might return the "401" response code and the client would prompt the user again, and send again a response.

This scheme can be implemented in a stateless way, which means that the server does not need to store any information relative to the authentication scheme to determine whether the user response is correct. However, as HTTP is transported over transmission control protocol (TCP), a TCP context is allocated for each new connection, so implementation is not completely stateless.

The digest authentication scheme does not limit the number of trials. The server always returns a 401 message with eventually a new nonce value each time the response code is not correct.

The application of the digest authentication scheme to the SIP protocol is described in RFC 3261. Some minor modifications have been applied that do not change the protocol specified by RFC 2617. However, as SIP can be transported over a user datagram protocol (UDP), the digest authentication scheme may be implemented in a completely stateless way. This method of authentication is supported by most of SIP client and server implementations.

This scheme is mainly used in SIP to authenticate REGISTER and INVITE messages. However, other type of messages such as SUBSCRIBE can also be authenticated by using this scheme.

FIG. 1 illustrates a typical SIP registering sequence with successful authentication. In step 101 the client sends an initiating REGISTER message, also called REGISTER or simply REG, to the server. Next in step 102 the server returns a "401" response message with a nonce value: this message is called a challenge. Upon reception, the client calculates the response and sends in step 103 a new REGISTER message to the server. The message includes the response code value and the nonce value which is kept identical to the nonce value sent by the server in step 102. This message is also called REG-A. When receiving the REG-A message, the server checks the response and sends in step 104 a "200" OK message to the client to notify that the registration has succeeded.

The digest authentication scheme is robust against brute force attack. From the username and the challenge response it is difficult to rediscover the password. However, some attacks are still possible.

A first kind of attack is message flooding. When choosing this attack, the attacker wants to exhaust server resources in order to create a denial of service (DoS) for all other users. To stay stealthy, the attacker can use spoofed IP addresses, which prevent applying a basic IP address filtering to protect the server against the flooding.

Initiating REGISTER message flooding can be issued by anybody since it only requires a valid username. An attacker that has collected information (sometimes directories are public) can achieve this very basic attack. The algorithm used to perform authentication must not prevent a valid user (i.e. user that can resolve the challenge) from registering itself while the system is under attack.

Authenticated REGISTER or REG-A message flooding requires knowing the passwords of the users in order to resolve the challenge proposed by the server. It also requires analysing the returned message in the attacking machine to get the nonce. This prevents spoofing of the IP address. However, the nonce values are slowly updated in most of SIP registrar servers, and thus nonce values can be shared between several attackers and IP spoofing is still possible. The authentication algorithm needs to take care that this kind of attack must not disturb authentication of healthy users, i.e. users whose password is kept secret.

The second kind of attack is a man-in-the-middle attack, and more precisely, a replay attack. It consists of replaying the REG-A message using the same nonce and response value, exploiting the possible slow variation of the nonce value in the authentication server. If the attack succeeds, the server will give the same credits as to the original user, and the attacker can freely use the service that is charged to its victim.

Digest authentication scheme can be implemented in a SIP registrar server in several ways. Indeed, RFC 2617 does not indicate how the nonce shall be chosen by the authentication server.

A first method is based on a stateless approach. A nonce is generated for a given period of time and is used for all users during this time. This method is efficient from a resource consumption point of view, but some replay attacks are possible while the nonce stays constant.

A second method is based on a state-full approach. A specific nonce is generated for every new incoming request. It is stored in a context associated to the newly opened dialog, and kept as long as the dialog is not terminated. The main problem is extensive memory resource consumed; above all when the SIP server is under flooding attacks. A "context collector" must be also implemented to release the context but as timer values are long in SIP (up to 2 minutes), the collector cannot be very efficient.

A third method proposes to generate a nonce specific for each received request taking into account sensible information of that request. This information is kept identical in the REG and REG-A messages. For a SIP REGISTER message, it can be the Contact field for instance. This method protects the server against replay attack. The main disadvantage of this method is that the nonce generation depends on the type of processed message and cannot be independent of the processing performed by the server. Furthermore, this method requires a deep message parsing to get sensible information. This operation consumes a lot of central processing unit (CPU) resources, and consequently, this mechanism is vulnerable to REG message flooding.

United States patent application publication 2006/0184681 by BEA Systems Inc. discloses a computer architecture for enterprise device applications that provides a real-time, bidirectional communication layer for device communication. An identity-based communications layer provides for secure, end-to-end telemetry and control communications by enabling mutual authentication and encryption between the devices and the enterprise. A unique identity is assigned to each device, user and application to provide security services. The unique identity is independent of a network-address. Security information and a network address may be associated with the unique identity. An authentication method based on nonce challenges is also disclosed.

The invention aims at providing an improved digest authentication method which is less vulnerable to the attacks identified above.

SUMMARY OF THE INVENTION

According to a first aspect of the invention there is thus proposed a method of authenticating a user in a communication system comprising a user terminal and an authentication server which is capable of storing two types of nonce values comprising dedicated nonce values unique in the system and common nonce values constant and common to all users managed by the authentication server during a fixed time period. The method comprises the following steps performed by the authentication server:
  receiving from the user terminal an access request;
  using a given criterion for determining the type of a first nonce value to be sent to the user terminal as a response to the access request;
  if the criterion is fulfilled, then sending at least one of the dedicated nonce values, otherwise sending at least one of the common nonce values;
  storing the first nonce value in a memory;
  receiving a response from the user terminal, the response comprising a second nonce value and a response code to the nonce value; and,
  determining whether the response code is correct and whether the second nonce value corresponds to the first nonce value sent by the authentication server.

The invention thus proposes a mechanism for generating and checking nonce values that remain compatible with any SIP clients supporting digest authentication. The main advantages of the present invention are that it allows protecting the authentication server against the following attacks:

a global DoS caused by an initiating REGISTER (REG) message flooding or an authenticated REGISTER (REG-A) message flooding;
a DoS against a set of users, that is, to prevent some targeted users from accessing the service; and
replay attacks.

In addition, the proposed mechanism can cope with IP address spoofing and is transparent to network address translation (NAT).

According to a second aspect of the invention there is further provided a computer program product comprising instructions for implementing the method according to the first aspect, when loaded and run on computer means of an authentication server.

According to a third aspect of the invention there is provided a device for authenticating a user terminal in a communication system, the device is capable of storing two types of nonce values comprising dedicated nonce values unique in the system and common nonce values constant and common to all users managed by the device during a fixed time period, the device comprising:
  a receiver for receiving from the user terminal messages, such as access requests and response codes; and
  a processor for using a given criterion for determining the type of a first nonce value to be sent to the user terminal as a response to an access request from the user terminal, wherein, in case the given criterion is fulfilled, the processor is arranged to send at least one of the dedicated nonce values, otherwise the processor is arranged to send at least one of the common nonce values, and wherein the processor is further arranged to determine whether a response comprising a second nonce value and a response code received from the user terminal as a response to the nonce value, is correct.

BRIEF DESCRIPTION OF THE DRAWINGS

Other features and advantages of the invention will become apparent from the following description of non-limiting exemplary embodiments, with reference to the appended drawings, in which:

FIGS. 6a and 6b are flow charts depicting an authentication method in accordance with an embodiment of the invention.

DETAILED DESCRIPTION OF EMBODIMENTS OF THE INVENTION

Some embodiments of the invention will now be described in more detail with reference to the appended drawings. In the following description, the embodiments of the invention are described in the context of REGISTER messages and SIP registrar servers, but the invention can be equally applied to any system employing digest authentication and a connectionless protocol, such as SIP or UDP.

Figure 1:
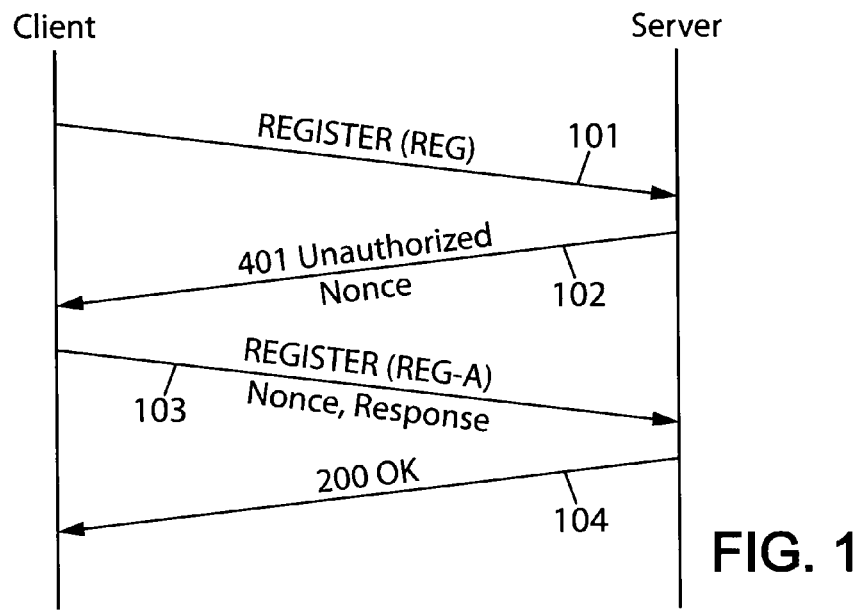
FIG. 1 shows a flow chart of a typical SIP registering sequence with authentication between a SIP client and a SIP registrar server.
Figure 2:
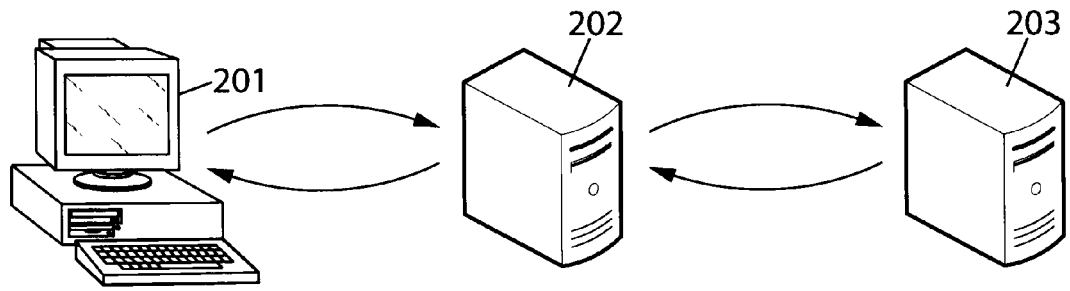
FIG. 2 is a block diagram showing an environment, where the teachings of the invention may be applied.

FIG. 2 illustrates an environment, where the teachings can be applied. In FIG. 2 there is shown a client's device 201, which in this case is a desktop computer. It can equally be any other device through which other network elements can be accessed. In the following description the proposed authentication method is implemented in a device or a logical module in front of a SIP server 203. This device is called an authentication filter 202. The authentication filter 202 is in charge of authenticating the requests, and forwarding only the authenticated requests to the SIP server 203 in order to enforce authentication security and to reduce the cost of processing authentication in the SIP server 203. This is particularly important when the server 203 faces a flooding attack. For that reason, the authentication filter 202 can be considered as a filter of the incoming SIP traffic and it can be a physical server placed in a different location than the SIP server 203. Alternatively the authentication filter 202 could be implemented simply by software, and it would be physically integrated with the SIP server 203. In addition, the proposed method is independent of the processing performed in the server 203.

Figure 3:
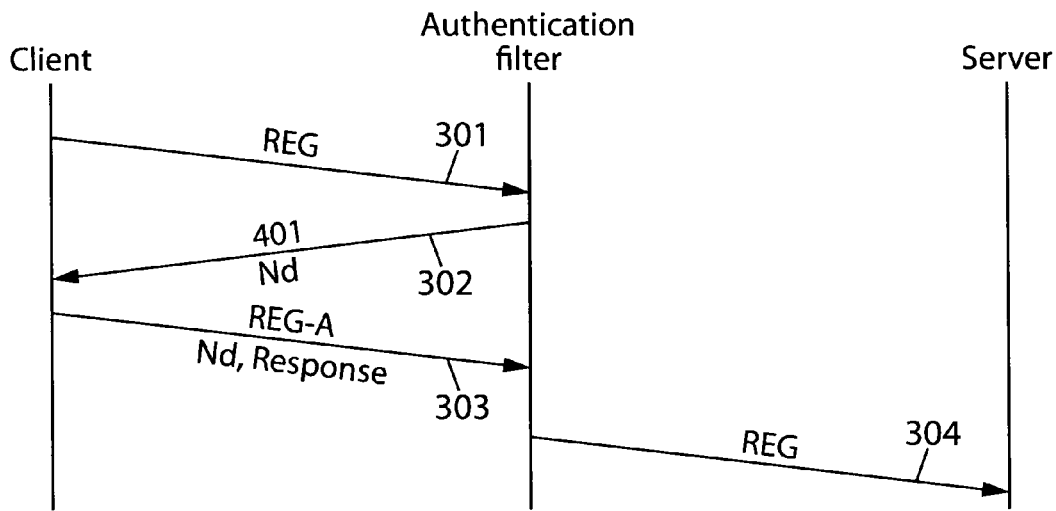
FIG. 3 is a flow chart showing a simple authentication procedure in accordance with an embodiment of the invention.

The proposed method mixes both the first and second nonce generation methods described in the background section. Reference is made to FIG. 3 in which the client 201 first sends in step 301 a REG message to the authentication filter 202. While the system is not under attack, a dedicated nonce Nd is generated upon reception of the REG message. In the same way the nonce Nd is allocated to every new incoming request. Then in step 302 the Nd value is sent to the client 201. In step 303 the client 201 responds by sending a REG-A message and now the authentication filter 202 is able to compare the returned Nd value with the original Nd value that it has generated. Upon receipt of the REG message, the authentication filter 202 stores the generated Nd value temporally in a table at least until it receives the REG-A message. If the authentication succeeds, the authentication filter 202 forwards in step 304 the REG message to the server 203. This filtering sequence is called a simple authentication method.

Figures 4, 5:
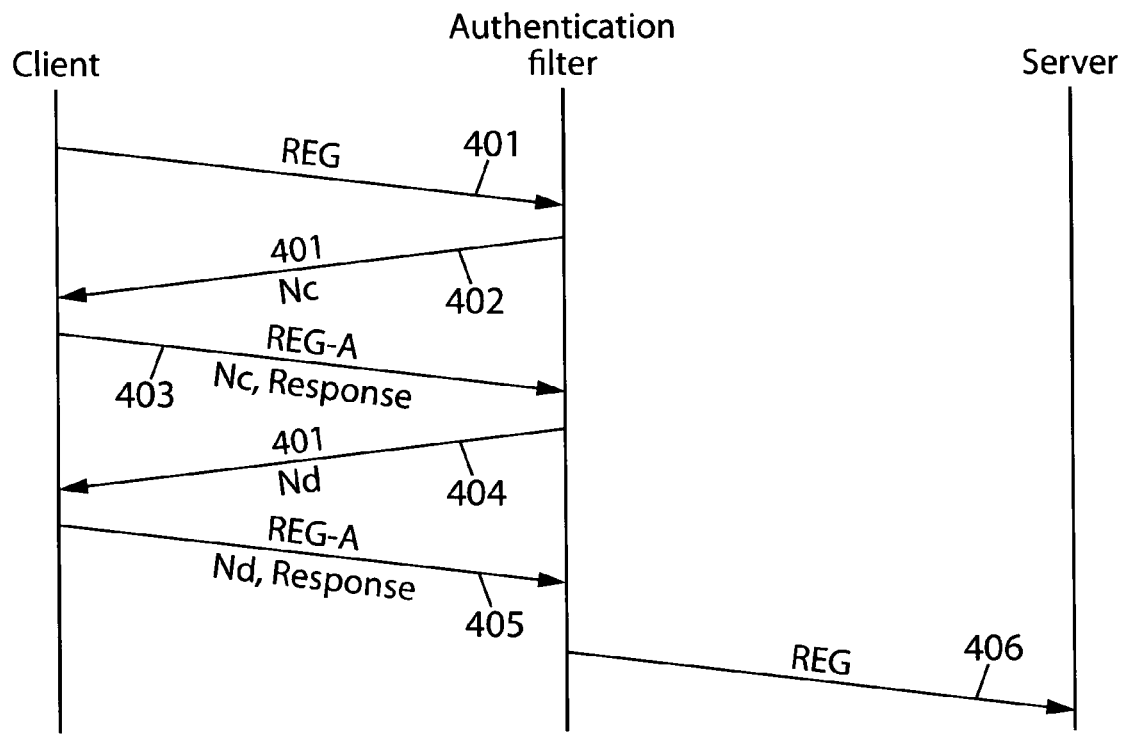
FIG. 4 is a flow chart showing a double authentication procedure in accordance with an embodiment of the invention.
FIG. 5 shows a structure of a hash table in accordance with an embodiment of the invention.

FIG. 4 describes the situation where the number of requests that are processed by the system is too large, i.e. the system is under attack, and the system is unable to get memory space for storing the Nd value. In this case a common nonce Nc is used and replied by the authentication filter 202 in the "401" message. In step 401 the client 201 sends a REG message to the authentication filter 202. Upon reception of this message the authentication filter 202 creates an Nd nonce value and checks whether there is memory space for this value. If this is not the case then it uses a common nonce value called Nc and sends this value to the client in step 402 in the "401" message. Indeed, the resolution of the challenge based on Nc proves that the client is not a flooding attacker. The client 201 responds in step 403 by sending a REG-A message which contains the Nc value and a response hash value it has calculated. The authentication filter 202 then verifies that the returned Nc value and response are correct. This step is called pre-authentication.

Once the client 201 has resolved the challenge based on the common nonce, then a dedicated nonce Nd is generated and saved in the memory space of the authentication filter 202. In step 404, a "401" message is returned by the authentication filter 202 with the Nd nonce. Thus, the system can give more credit to the request sent in step 404, and memory space can be preferably allocated to store the Nd value. Then in step 405 the client 201 sends a second REG-A message to the authentication filter 202. This time the REG-A message contains the Nd value and also a corresponding response hash value. Finally the authentication filter 202 verifies that the information sent by the client is correct and sends, in step 406, a REG message to the server 203. This filtering sequence is called a double authentication method.

The double authentication method uses two types of nonce values: a common nonce Nc value that is constant and common to all users managed by the authentication filter 202 during a fixed period of time, for instance 1 second, and some dedicated nonce values Nd specific to either a private identity, such as a username, or an end point, e.g. duplet IP source address/UDP source port. Both nonce values are randomly generated and it can be assumed that they are different each time. Nc is kept in the authentication filter 202 using a single global value that is compared with the received REG-A message to evaluate its validity.

A single table called Nd table is used to store the Nd values in both the simple and double authentication methods. The Nd table can for instance be a hash table. However, as explained before, Nd values that are allocated to some requests of the double authentication procedure have more credit than those of the simple authentication method. Consequently, for the management of the memory used by the Nd table, priority is given to requests of the double authentication procedure. In particular, in case of memory starvation, a part of the memory used for requests of the simple authentication method can be re-allocated for requests of double authentication procedure.

The memory locations in the Nd table are indexed in a different way according to the type of the authentication method. Indexation is used to retrieve an Nd value stored in the Nd table upon receipt of a REG-A message. In the double authentication method, at the end of the step 403, the system has identified the username since the client has just resolved the challenge based on the Nc value. So, the username can be safely used to index the Nd table. On the contrary, in the simple authentication procedure, either the username is not specified in the REG message, or it is not safely identified. For that reason, the IP address, the UDP source port and the generated nonce Nd value are used to index the Nd table.

Indexation based on the username prevents an attacker from filling the Nd table using only one valid username. Indeed, the same record is used for all requests sent by a single identified user. This feature is particularly important because of the priority applied to the requests of the double authentication method. Attack detection and the switching between both procedures are triggered by detection of collisions in the Nd table.

The dedicated nonces have a time-limited validity. Once expired, the stored nonce can be removed and further messages conveying this nonce are considered as invalid.

For nonce values indexed by the username, i.e. double authentication method, the dedicated nonce values cannot be changed until the challenge is resolved or its validity expires. This feature prevents attackers from launching DoS attacks against particular users. Indeed, if the dedicated nonce value was changed each time a new request was received, then an attacker would be able to force the authentication filter 202 to continuously change the nonce value before the real targeted user can resolve the challenge.

Once authentication succeeds, the request is forwarded to the server 203 so that it can be processed. If a repetition of that request is received by the authentication filter 202 with the same Nd nonce value and a correct challenge response, then the message is not forwarded but a different Nd nonce is generated and allocated to that request. A "401" message with this new nonce value is then returned to the client 201.

Although it disrupts the repetition mechanism of the SIP protocol over UDP, it prevents attackers from doing replay-attacks.

Priority is given to requests of the double authentication method. This is due to the fact that a priority bit is attached to each record or entry of the Nd table. For simple authentication method priority bit is unset. If a collision occurs, then the record is unchanged and the Nc nonce value is used. Consequently, the system switches to the double authentication procedure for that request only. For double authentication procedure, priority bit is set. In case of collision, if the priority bit of the used record is unset, the record is overwritten. Otherwise, it is unchanged and the Nd stored value is used in the returned "401" message for challenging the client 201.

For both authentication methods, when the challenge is resolved, the dedicated nonce Nd is marked using an authentication bit A attached to each record of the Nd table.

When a challenge response is checked positively by the authentication filter 202, and if the A bit is already set, then the message is not forwarded to the server 203, but a new dedicated nonce is generated. This prevents the replay attacks. When writing a new nonce value Nd in the Nd table, and if a collision occurs with a record with the A bit set, then the record is overwritten with the new Nd value.

Time information is added to each record and indicates the time instant of the creation of the dedicated nonce, which is stored in the record, so that records with a too old nonce can be overwritten by considering whether the validity of the stored dedicated nonce Nd has expired.

The nonce values Nd are stored in the Nd table indexed using two different hash functions. The first function H1 is used for the simple authentification method and is calculated from the client's IP address, UDP client port and Nd itself. A new entry may be added in the table using H1 upon receipt of a REG message by the authentication filter 202.

The second function H2 is used for the double authentication method and is calculated from the username. A new entry is added in the table using H2 upon receipt of a REG-A message with the common nonce Nc and a valid response. H1 and H2 are used to write a new dedicated nonce value in the table or to verify that a nonce contained in a REG-A message is valid.

Nd table indexation is uniformly distributed due to the properties of H1 and H2 hash functions. Ideally, H1 and H2 are random with uniform output, and they are independent. The collision rate inside the Nd table does not depend on the number of different hash functions that are used to index the table, providing they are independent and random. Consequently, the Nd table can be accessed by two different hash functions without changing the properties of the hash functions.

The following table summarises the information described above.

|    | Indexation | Writing | Reading |
| --- | --- | --- | --- |
| H1 | IP source address, source port, Nd | REG | REG-A, nonce ≠ Nc |
| H2 | Username | REG-A, nonce = Nc | REG-A, nonce ≠ Nc |

Each record in the Nd table contains the following information:

A validity bit (V): indicates if the record is used.
A priority bit (P): indicates the priority of the record.
An authentication bit (A): indicates that authentication has succeeded.
A dedicated nonce value (Nd).
A timestamp value: indicates the date of the record insertion. It is used to determine if a record is too old and can be overwritten.

A record with high priority, i.e. P=1 cannot be overwritten except if A is set or the date has expired. A record with low priority, i.e. P=0 can be overwritten when pre-authentication succeeds (double authentication method). The timestamp, instead of indicating the date of the insertion of the record, could also indicate the expiry of the validity of the record.

FIG. 5 shows an example of the Nd table. In this case the system is only slightly charged since there are only two records in the table. As can be seen, for each entry V bit is set to 1 to indicate that the memory location in question is occupied. Furthermore, for the second record, also the authentication bit is set to 1. This means that the corresponding request by the client has already been approved or verified to be correct and thus this memory location may be overwritten.

Next reference is made to FIG. 6a, which depicts a flow chart describing the process in accordance with an embodiment of the invention from the moment when a request is received from the client 201 until the end of the authentication process. First in step 601 the authentication filter 202 receives an access request message, in this case either a REG message or a REG-A message. Upon receipt of the message, the presence of an authorisation field is used to determine, in step 602, the type of the message, i.e. whether the received message is either a REG or a REG-A message.

In case the received message is a REG message, a dedicated nonce value Nd is generated in step 603. This corresponds to the situations of FIGS. 3 and 4, where the filter 202 has received the requests 301 and 401, respectively. The Nd value is generated each time a new REG message is received. H1 function is then used for calculating in step 604 a memory location in the Nd table for this Nd value. Next in step 605 it is determined whether there is a collision between the calculated memory location obtained by using H1 function and a record in the table. This can be done by comparing whether V equals 0 or A equals 1 in the record indexed by the H1 function. If one of these conditions is fulfilled, there is no collision in the table. If there is no collision in the table, the Nd value is sent in step 606 to the client in the "401" message. This corresponds to step 302. In step 607 the record is updated so that A and P bits are set to 0 and V bit is set to 1. In other words, the record is written with low priority, and it is indicated that this memory location is in use and that authentication has not yet succeeded. In case of a collision, i.e. the condition V=0 or A=1 is not fulfilled, then the common nonce value Nc is used and sent in step 608 in the "401" message to the client 201. This corresponds to step 402.

If in step 602 it is determined that the message type is REG-A, then in step 610 the nonce value received by the authentication filter 202 is compared to the current Nc value stored in the authentication filter 202. The Nc is in this embodiment stored in a single memory storage independent of the Nd table. If it is determined that the received nonce value equals the Nc stored in the authentication filter 202, then in step 611 it is contemplated whether the challenge response received from the client 201 is correct. This means that the response code and the nonce values from the client 201 have to be both correct. If the response to the challenge is not correct, the authentication filter 202 sends, in step 612, a "403" message to the client 201. This means that the authentication filter 202 may be under a REG-A message flooding attack and the authentication procedure is aborted.

On the other hand, if the challenge response is determined to be correct, then in step 613 an index in the Nd table is calculated using the H2 function. This calculation is based on the username of the client 201. Next in step 615 it is checked whether there is a collision in the Nd table between a record in the table and the calculated index indicating a memory location in the table. This is done by determining whether the following conditions are fulfilled: V=1, P=1 and A=0. If all these conditions are fulfilled, this means that there is a collision and the memory location is already in use with priority bit set and that the authentication has not yet succeeded, then in step 620 a time comparison is performed. If the time comparison indicates that the current memory location is still in use, i.e. the time has not yet expired, then the Nd nonce stored in the hash table is resent in step 621 to the client 201 using a "401" message and the record is kept unchanged. This feature prevents attackers from sending continuously requests in order to change the dedicated nonce for a particular user, which would prevent this user from authenticating with the authentication filter 202.

If the time comparison in step 620 indicates that the memory location obtained by using H2 function is no longer in use, then in step 616 a new nonce Nd is generated. It is sent, in step 617, to the client 201 in a "401" message and the record is updated in step 618 so that V=1, P=1 and A=0. If in step 615 it is determined that at least one of the following conditions V=1, P=1 or A=0 is not fulfilled, then it can be determined that there is no collision in the Nd table, i.e. the calculated memory location is vacant in the table, then the steps 616, 617 and 618 are performed next. From steps 618 or 621 the process may continue again in step 601.

Figure 6B:
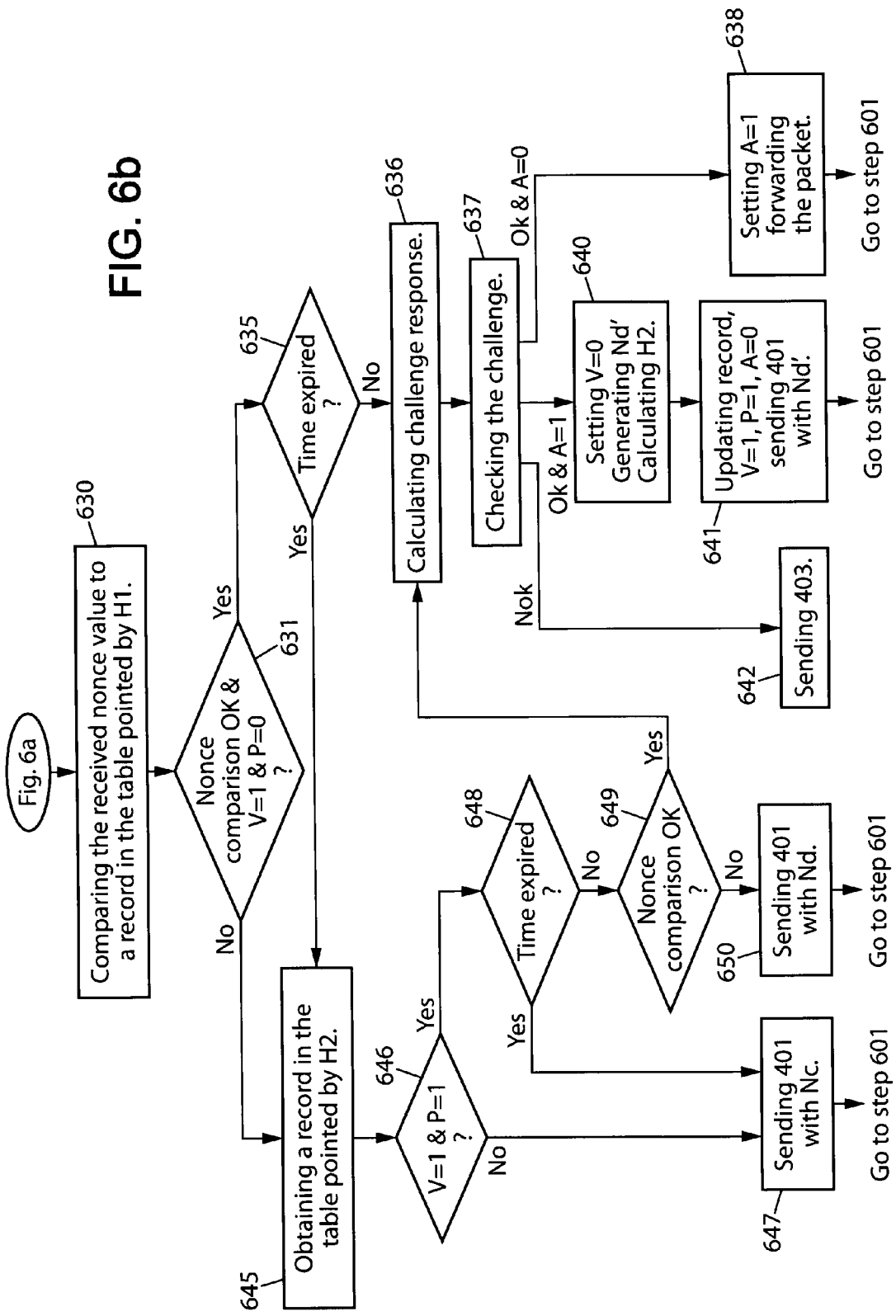

If in step 610 it is determined that the received nonce value from the client 201 does not correspond to the Nc value stored in the table, then reference is made to FIG. 6b, where the procedure continues in step 630. In step 630 the nonce received from the client 201 is compared to the stored one that is pointed by H1. In step 631 it is determined whether V=1 and P=0 in the record pointed by the H1 function and that the received nonce corresponds to the nonce value stored in the record. If this is the case, then in step 635 it is determined whether time validity has expired. Step 635 corresponds to the situation in FIG. 3, where the authentication filter 202 has received the REG-A message from the client 201 sent in step 303. If the time has not yet expired and the received nonce is identical with the nonce stored in the authentication filter 202, then in step 636 the authentication filter 202 calculates the response to the challenge. Next the challenge response sent by the client 201 is compared in step 637 to the calculated challenge response and it can thereby be determined whether the challenge response sent by the client 201 is correct.

If this is the first time the challenge is solved, i.e. A=0, then the request is considered as authenticated and is forwarded in step 638 to the server 203. A bit is then set to 1 indicating that the authentication has succeeded. If this is not the first time, i.e. A=1, then the record is invalidated in step 640 and a new dedicated nonce value Nd' is generated and added in the table at the index pointed by H2. Then the record is updated in step 641 so that V=1, P=1 and A=0 and the generated Nd' is sent to the client 201 in a "401" message. If the challenge response is not correct, a "403" message is returned in step 642 to the client 201.

If in step 631 the requirement V=1 and P=0 is not fulfilled or nonce comparison fails, then the record pointed by H2 is considered in step 645. Step 645 corresponds to the situation in FIG. 4, where the authentication filter 202 has received the REG-A message from the client 201 sent in step 405. In step 646 it is determined whether there is a collision in the table. This is done by determining whether V bit equals 1 and P bit equals 1. If this is not the case or time validity has expired, a "401" message, including the Nc nonce value, is replied in step 647 to the client 201. If in step 646 a collision is detected, i.e. V=1 and P=1, then in step 648 time comparison is performed in order to detect whether the memory location is question is still in use. If the time has not yet expired, then the received nonce value is compared in step 649 to the nonce value stored in the Nd table. If these two nonce values match, the procedure continues in step 636. If these two nonce values do not match, then the nonce value Nd stored in the Nd table is resent in step 650 to the client in a "401" message. On the other hand, if in step 648 it is determined that the time has expired, then a "401" message containing the Nc nonce value is replied in step 647 to the client 201. From steps 638, 641, 647 and 650 the process may again continue in step 601.

The main parameter of the authentication algorithm presented above is the size of the Nd table. In accordance with the teachings of this invention this table cannot be simply filled by a REG flooding attack because of the pre-authentication procedure. Furthermore, if an attacker can control several users by knowing their passwords, the attacker would only disturb these users because the use of the H2 function prevents the attacker from disturbing other users. The table shall be sized by using two parameters:

the number of users that want to simultaneously register themselves. It is linked to the number of users (i.e. customers) in the database.

the mean duration of the registration procedure, that is the time the nonce shall be stored in the Nd table. It can be controlled by correctly setting the time validity of the dedicated nonce value.

The authentication algorithm can be implemented in a filtering device 202 in front of the SIP servers 203 or gateways. Alternatively, it can be directly implemented in the SIP servers 203 as a filtering device that protects one or more SIP servers 203. In this case, digest authentication can be completely disabled between the filter and the SIP servers.

More generally, the proposed mechanism can be applied to any protocol running over UDP and that uses digest authentication as defined by RFC 2617. Furthermore, it is applicable to protocols running over TCP, combined with a TCP context free method, for instance SYN cookies, in order to be resilient to flooding attacks.

The invention equally relates to a computer program product that is able to implement any of the method steps of the embodiments of the invention when loaded and run on computer means of the authentication filter 202.

The invention equally relates to the authentication filter 202 that is arranged to implement the method steps described above. The computer program can be arranged to be run by the authentication filter 202.

While the invention has been illustrated and described in detail in the drawings and foregoing description, such illustration and description are to be considered illustrative or exemplary and not restrictive; the invention is not restricted to the disclosed embodiments.

Other variations to the disclosed embodiments can be understood and effected by those skilled in the art in practicing the claimed invention, from a study of the drawings, the disclosure and the appended claims. For instance the detection of attacks can be based on the detection of number of access requests received at the authentication filter 202. This would avoid generating the dedicated nonce value Nd every time a REG message is received. In the claims, the word "comprising" does not exclude other elements or steps, and the indefinite article "a" or "an" does not exclude a plurality.

A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method, performed by an authentication server, of authenticating a user in a communication system comprising a user terminal and the authentication server which is capable of storing two types of nonce values comprising dedicated nonce values unique in the system and common nonce values constant and common to all users managed by the authentication server during a fixed time period, the method comprising:

receiving from the user terminal an access request;

determining, using a given criterion, the type of a first nonce value to be sent to the user terminal as a response to the access request, wherein, in case the given criterion is fulfilled the type of the first nonce value is a dedicated nonce value, otherwise the type of the first nonce value is a common nonce value which is constant and common to all of the users managed by the authentication server during the fixed time period;

sending the first nonce value which has been determined;

receiving a response from the user terminal, the response comprising a second nonce value and a response code to the first nonce value sent by the authentication server; and determining whether the response code is correct and whether the second nonce value corresponds to the first nonce value sent by the authentication server.

2. The method according to claim 1, wherein the given criterion comprises the authentication server generating a dedicated nonce value and determining a memory location for the generated dedicated nonce value and if the memory location is vacant, then concluding that the given criterion is fulfilled.

3. The method according to claim 2, wherein the dedicated nonce value is generated randomly by the authentication server.

4. The method according to claim 1, wherein the given criterion comprises determining the number of received access requests in a time unit and if the number is lower than a predetermined threshold, then concluding that the given criterion is fulfilled.

5. The method according to any of the preceding claims, wherein the response code is calculated by the user terminal based on the nonce value received from the authentication server and password and username of the user.

6. The method according to claim 1, further comprising:
forwarding the access request to a server, after having determined that the response code to the dedicated nonce value is correct and that the second nonce value corresponds to the first nonce value, when the given criterion is fulfilled.

7. The method according to claim 1, further comprising:
refusing the access request in case it is determined that the response code is not correct or that the second nonce value does not correspond to the first nonce value.

8. The method according to claim 1, further comprising:
storing, in a table, the dedicated nonce value, when the given criterion is fulfilled; and
indexing a memory location in the table using an internet protocol source address of the user terminal, user datagram protocol source port of the user terminal, and the dedicated nonce value.

9. The method according to claim 1, further comprising:
generating a dedicated nonce value, sending the dedicated nonce value to the user terminal, receiving a second response code from the user terminal, verifying that the second response code is correct and forwarding the access request to a server, when the given criterion is not fulfilled, after having determined that the response code to the common nonce value is correct and that the second nonce value corresponds to the first nonce value.

10. The method according to claim 1, further comprising:
storing the dedicated nonce value in a table, a memory location in the table being indexed using a username of the user terminal, the storing occurring when the given criterion is not fulfilled, after having determined that the response code to the common nonce value is correct and that the second nonce value corresponds to the first nonce value.

11. The method according to claim 8 or 10, wherein a single table is used irrespective of the method of indexing the memory locations in the table.

12. The method according to claim 1, wherein the common nonce and the dedicated nonce values have limited time validities.

13. The method according to claim 8, wherein each entry in a certain memory location of the table is associated with a priority bit, an authentication bit and timestamp and each entry can be overwritten by a new nonce value, if the priority bit is unset or if the authentication bit indicates that the corresponding request has already been approved or if the timestamp indicates that the current entry is no longer valid.

14. The method according to claim 13, wherein the priority bit is set when the response code to the common nonce value has been determined to be correct and when the second nonce value corresponds to the first nonce value, otherwise the priority bit is unset.

15. The method according to claim 13, wherein the authentication bit is set when the access request has been forwarded to a server, otherwise the authentication bit is unset.

16. A computer program product comprising instructions for implementing the steps of a method according to claim 1 when loaded and run on a computer of the authentication server.

17. A device for authenticating a user terminal in a communication system, the device being capable of storing two types of nonce values comprising dedicated nonce values unique in the system and common nonce values constant and common to all users managed by the device during a fixed time period, the device comprising:

a receiver for receiving from the user terminal messages; and a processor for using a given criterion for determining the type of a first nonce value to be sent to the user terminal as a response to an access request from the user terminal, wherein, in case the given criterion is fulfilled, the processor is arranged to send a dedicated nonce value, otherwise the processor is arranged to send a common nonce value which is constant and common to all of the users managed by the device during the fixed time period, the processor is further arranged to determine whether a response comprising a second nonce value and a response code received from the user terminal as a response to the first nonce value is correct.

18. The device according to claim 17, further comprising: a memory for storing common and dedicated nonce values.

19. An authentication server for authenticating a user terminal, the authentication server comprising a device according to claim 17.

* * * * *